(12) United States Patent
Hirasawa et al.

(10) Patent No.: US 11,528,384 B2
(45) Date of Patent: Dec. 13, 2022

(54) IMAGE FORMING SYSTEM, IMAGE FORMING APPARATUS, AND NON-TRANSITORY COMPUTER-READABLE STORAGE MEDIUM FOR EXPORTING AND IMPORTING CONFIGURATION INFORMATION VIA RECORDING MEDIUM

(71) Applicant: BROTHER KOGYO KABUSHIKI KAISHA, Nagoya (JP)

(72) Inventors: Yoshi Hirasawa, Anjo (JP); Satoshi Tanimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/555,708

(22) Filed: Dec. 20, 2021

(65) Prior Publication Data
US 2022/0239800 A1 Jul. 28, 2022

(30) Foreign Application Priority Data
Jan. 25, 2021 (JP) .............................. JP2021-009595

(51) Int. Cl.
*H04N 1/44* (2006.01)
*H04N 1/00* (2006.01)

(52) U.S. Cl.
CPC ......... *H04N 1/4413* (2013.01); *H04N 1/0097* (2013.01); *H04N 1/00965* (2013.01)

(58) Field of Classification Search
None
See application file for complete search history.

(56) References Cited

U.S. PATENT DOCUMENTS

| 9,703,976 | B1* | 7/2017 | Brandwine | G06F 21/6218 |
| 2014/0022591 | A1* | 1/2014 | Asahara | G06F 3/1236 |
| | | | | 358/1.15 |
| 2020/0296227 | A1* | 9/2020 | Yamada | H04N 1/4413 |

FOREIGN PATENT DOCUMENTS

JP 2007-276362 A 10/2007

* cited by examiner

*Primary Examiner* — Lennin R RodriguezGonzalez
(74) *Attorney, Agent, or Firm* — Scully, Scott, Murphy & Presser, PC

(57) ABSTRACT

An image forming system including first and second image forming apparatuses each including a controller, a media interface, a memory, and a user interface. When configuration information is not stored in a recording medium connected to the media interface of the first image forming apparatus, the controller of the first image forming apparatus encrypts configuration information stored in the memory of the first image forming apparatus using a data password received via the user interface of the first image forming apparatus, and exports the encrypted configuration information to the recording medium. When configuration information is stored in a recording medium connected to the media interface of the second image forming apparatus, the controller of the second image forming apparatus decrypts the configuration information stored in the connected recording medium using a data password received via the user interface of the second image forming apparatus, and imports the decrypted configuration information.

17 Claims, 11 Drawing Sheets

FIG. 8

EXAMPLE OF "export.txt/import.txt"　33,34

DVP2 → DEVICE PASSWORD ="admin"
DTP2 → DATA PASSWORD ="abcdefg"
35 {
SELECT=＊＊＊
EXCEPTED=＊＊＊
REPLACED=＊＊＊
⋮

FIG. 11

EXAMPLE OF CONFIGURATION FILE ("Backup.json")  —7A

```
LOCATION : Team1
CONTACT : team1@mail.co.jp

IPAdress 123.222.123.222
MailServer : 123.123.123.222

SCAN SETTINGS

DISPLAY NAME : ScanTo1

TRANSMISSION DESTINATION : 123.123.123.123

SCANNING RESOLUTION : 300dpi

DOUBLE-SIDED SCANNING : On

COLOR SCANNING : On

COPY SETTINGS

DISPLAY NAME : Copy1

SCANNING RESOLUTION : 200dpi

COLOR PRINTING : On

DOUBLE-SIDED PRINTING : On
```

IMAGE FORMING SYSTEM, IMAGE FORMING APPARATUS, AND NON-TRANSITORY COMPUTER-READABLE STORAGE MEDIUM FOR EXPORTING AND IMPORTING CONFIGURATION INFORMATION VIA RECORDING MEDIUM

CROSS REFERENCE TO RELATED APPLICATIONS

This application claims priority from Japanese Patent Application No. 2021-009595 filed Jan. 25, 2021. The entire content of the priority application is incorporated herein by reference.

BACKGROUND

There has been conventionally known an image forming apparatus that imports device configuration information from a USB memory or another recording medium as its own configuration information. When importing configuration information from the USB memory, the conventional image forming apparatus performs login authentication based on a password included in an instruction information file. If login authentication is successful, the image forming apparatus imports the configuration information based on write instructions included in the instruction information file.

SUMMARY

However, in order to have the conventional image forming apparatus import configuration information thereto, password information must be included in an instruction information file. Consequently, the user must prepare in advance an instruction information file that includes password information as text data or the like and must store this instruction information file in the USB memory.

In view of the foregoing, it is an object of the present disclosure to provide an image formation system, an image forming apparatus, and a non-transitory computer-readable storage medium that enhance usability by being capable of duplicating configuration information without the use of instruction information.

In order to attain the above and other objects, the present disclosure provides an image forming system including a plurality of image forming apparatuses. The plurality of image forming apparatuses including a first image forming apparatus and a second image forming apparatus. Each of the plurality of image forming apparatuses includes an image forming engine, a memory, a media interface, a user interface, and a controller. The controller is configured to control the image forming engine to perform image formation according to an operation setting included in configuration information stored in the memory. The controller of the first image forming apparatus is configured to perform exporting configuration information. The controller of the second image forming apparatus is configured to perform importing configuration information.

According to another aspect, the present disclosure provides an image forming apparatus including an image forming engine, a memory, a media interface, a user interface, and a controller. The controller is configured to control the image forming engine to perform image formation according to an operation setting included in configuration information stored in the memory. The controller is configured to perform exporting configuration information. The controller is configured to perform importing configuration information.

According to still another aspect, the present disclosure provides a non-transitory computer-readable storage medium storing computer-readable instructions for an image forming apparatus. The image forming apparatus includes an image forming engine, a memory, a media interface, a user interface, and a controller. The controller is configured to control the image forming engine to perform image formation according to an operation setting included in configuration information stored in the memory. The computer-readable instructions, when executed by the controller, cause the image forming apparatus to perform exporting configuration information. The computer-readable instructions, when executed by the controller, cause the image forming apparatus to perform importing configuration information.

BRIEF DESCRIPTION OF THE DRAWINGS

The particular features and advantages of the embodiment(s) as well as other objects will become apparent from the following description taken in connection with the accompanying drawings, in which:

FIG. 8 is a view illustrating an example of the import text/export text;

FIG. 11 is a view illustrating an example of a configuration file.

DETAILED DESCRIPTION

Figure 1:
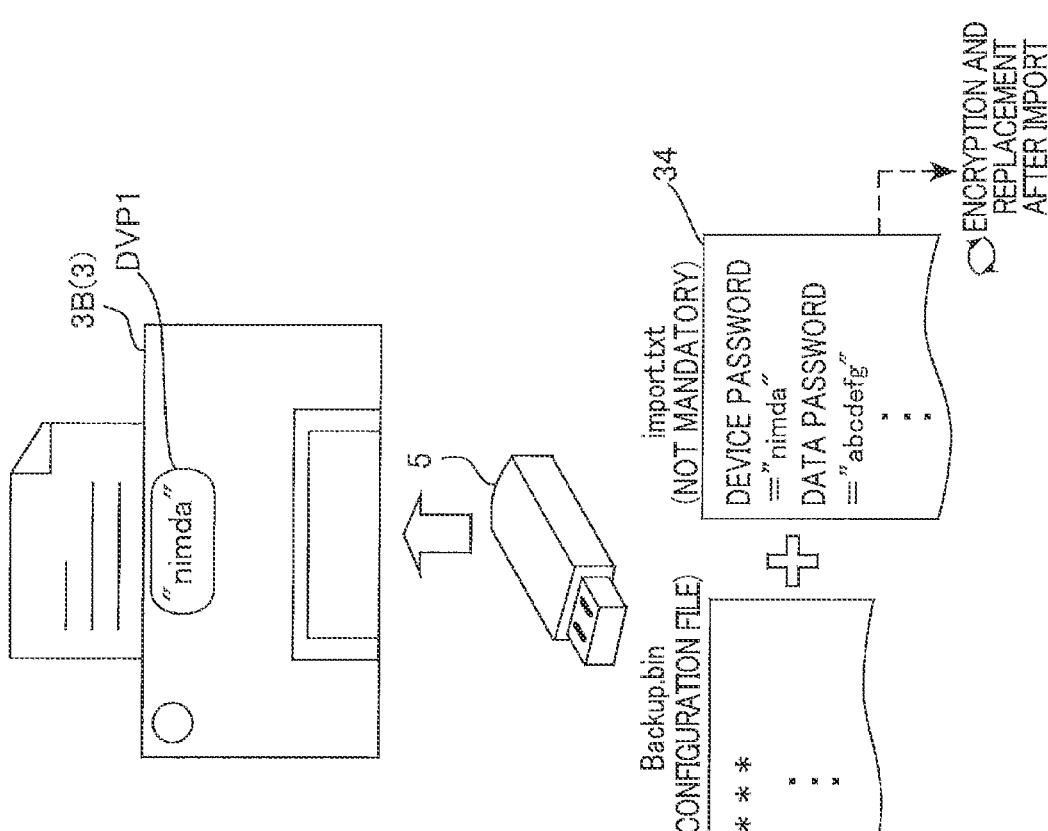
FIG. 1 is a conceptual diagram illustrating an overview of a printing system of the present disclosure.

Below, a printing system 1 according to one embodiment of the image formation system of the present disclosure will be described while referring to the accompanying drawings. FIG. 1 conceptually illustrates an overview of the printing system 1. The printing system 1 includes a plurality of multifunction peripherals 3 (hereinafter, will be sometimes abbreviated as "MFPs 3"). In this example, the printing system 1 includes two MFPs 3. In the printing system 1, configuration information 6 stored on a freely-selected one of the MFPs 3 can be exported from that MFP 3 to a USB memory 5 in the form of a configuration file 7. Further, by importing the configuration file 7 from the USB memory 5 into other MFPs 3, the configuration information 6 of the freely-selected MFP 3 can be copied to a plurality of MFPs 3.

For convenience of description, the MFP 3 that exports the configuration information 6 will be called the MFP 3A, while the MFP 3 that imports the configuration information 6 will be called the MFP 3B. Further, the plurality of MFPs 3 will be collectively called MFPs 3. The MFPs 3A and 3B are the same model of MFP, for example. Additionally, the configuration information stored on the MFP 3 will be called the configuration information 6, while configuration information stored in the configuration file 7 will be called configuration information 6A.

Figure 2:
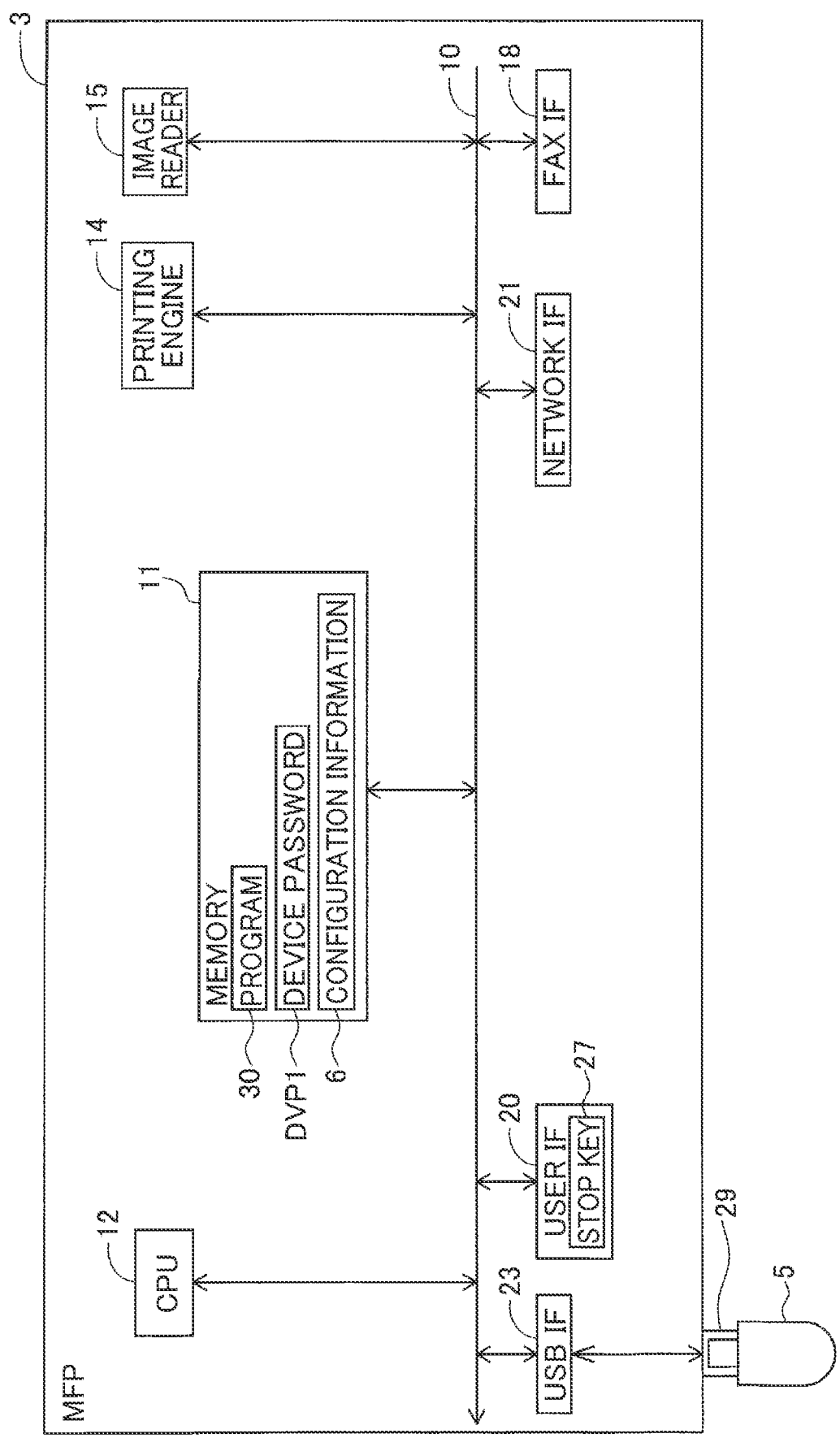
FIG. 2 is a block diagram illustrating the structure of an MFP.

The MFP 3 is provided with a print function, a copy function, a scan function, and a fax function, for example. As shown in FIG. 2, the MFP 3 includes a memory 11, a CPU 12, a printing engine 14, an image-reader 15 for reading images, a fax interface 18 for transmitting and receiving faxes, a user interface 20, a network interface 21, and a USB interface 23. The above components are interconnected via a bus 10.

The memory 11 is provided with RAM, ROM, and nonvolatile memory such as EEPROM, for example. The memory 11 may also be provided with a hard disk drive, nonvolatile random-access memory (NVRAM), flash memory, and the like. The memory 11 may also be a computer-readable storage medium. A computer-readable storage medium is a non-transitory medium. In addition to the above examples, non-transitory media include storage media such as CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

In this example, a device password DVP1 and the configuration information 6 are stored in a nonvolatile storage area of the memory 11. Note that the device password DVP1 and the configuration information 6 may be already stored in the memory 11 at the time of the shipment of the MFP 3. Alternatively, the device password DVP1 and the configuration information 6 may be stored in the memory 11 after the shipment of the MFP 3. The printing engine 14 has an electrophotographic print engine, for example, and prints according to an electrophotographic method. Note that the print engine may instead be configured to print according to an inkjet method using an inkjet head and the like.

The user interface 20 includes a touchscreen and keys, for example. The user interface 20 in the present embodiment includes a Stop key 27. The Stop key 27 is a key for inputting a command to halt operations and processes currently being executed on the MFP 3. The network interface 21 is a LAN interface, for example. The USB interface 23 is an interface conforming to the USB standard and exchanges data with the USB memory 5 via a USB port 29.

In this example, various programs executed by the CPU 12 are stored in a nonvolatile storage area of the memory 11. The stored programs include a program 30 for performing overall control of the components in the MFP 3, for example. The present embodiment primarily describes processes executed by the CPU 12 according to instructions described in the program 30. Processes performed by the CPU 12 include hardware control. In the following description, actions such as "determine" and "export" represent processes performed by the CPU 12. Note that the term "acquire" in this specification is used as a concept that does not necessarily require a request. In other words, a process by which the CPU 12 receives data without requesting that data is included in the concept of "the CPU 12 acquires data." In the following description, the action of the MFP 3 executing the program 30 using the CPU 12 may simply be described using the device name. For example, the description "the CPU 12 reads the configuration information 6 from the configuration file 7 of the USB memory 5 via the USB interface 23" may denote that "the MFP 3 controls the USB interface 23 by means of the CPU 12 executing the programs 30 in order to read the configuration information 6 from the configuration file 7 of the USB memory 5 via the USB interface 23."

FIGS. 3-7 show details of an import/export process. In the description of the processes in FIGS. 3-7, "S" provided at the beginning of the numbers is an abbreviation of "step." The CPU 12 begins executing the process in FIGS. 3-7 once the power to the MFP 3 is turned on and the CPU 12 has begun executing the programs 30 to start up the system.

Figure 3:
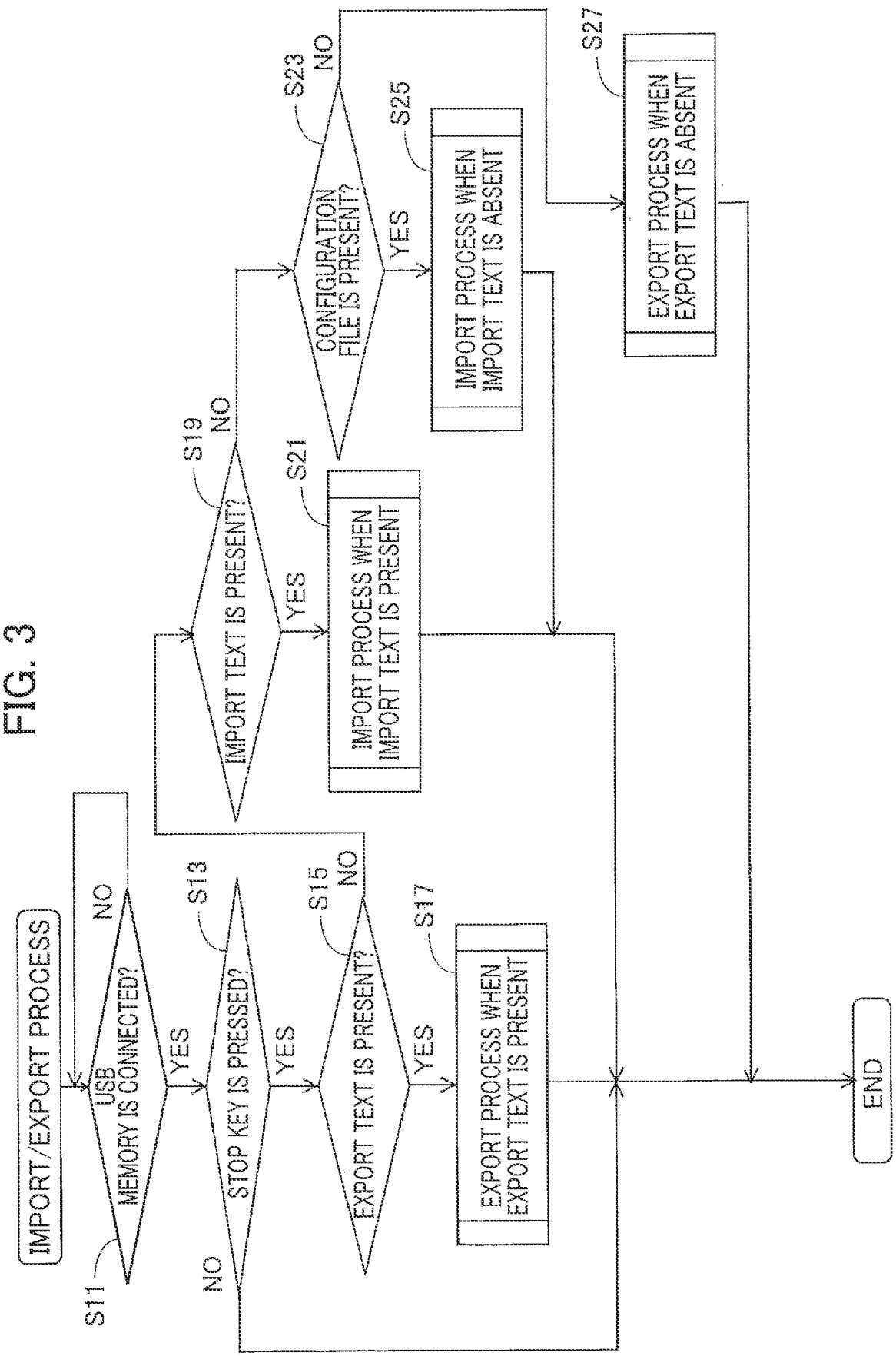
FIG. 3 is a flowchart of an import/export process.

In S11 at the beginning of the process in FIG. 3, the CPU 12 continually monitors the USB port 29 while a USB memory 5 has not been detected (S11: NO). When the CPU 12 detects that a USB memory 5 has been inserted in the USB port 29 (S11: YES), in S13 the CPU 12 determines whether the Stop key 27 is in a pressed state. If the CPU 12 determines that the Stop key 27 is not in a pressed state (S13: NO), the CPU 12 ends the process of FIG. 3. In such cases, the CPU 12 uses the USB memory 5 as external memory and executes processes for reading and writing data, for example. If the operator inserts the USB memory 5 while not pressing the Stop key 27 (i.e., with the Stop key 27 in a non-pressed state), the CPU 12 may execute operations for printing print data stored in the USB memory 5 or for storing scan data in the USB memory 5, for example.

However, if the Stop key 27 is in a pressed state (S13: YES), the CPU 12 executes either an import process or an export process according to the steps beginning from S15. That is, the CPU 12 executes the import process or export process when the user mounts the USB memory 5 while pressing the Stop key 27. The operation to the Stop key 27 is an example of a prescribed operation. Inserting the USB memory 5 into the USB port 29 (i.e., connecting the USB memory 5 to the USB interface 23) while the Stop key 27 is being pressed is an example of the prescribed condition. However, the prescribed condition is not limited to this condition but may be a condition such as the user inserting the USB memory 5 while the power key or other key is being pressed, while a plurality keys are being pressed simultaneously, while the paper tray is open, or in another state; or a condition in which the user inserts the USB memory 5 within a prescribed period of time after the Stop key 27 or another key has been pressed for an extended time (i.e., has been held down) or after a plurality of keys has been pressed simultaneously. In this way, the prescribed condition requires at least connecting the USB memory 5 to the USB interface 23. In other words, at least connection of the USB memory 5 to the USB interface 23 is required for the prescribed condition to be met. The Stop key 27 or other key need not be a hardware key but may be a software key displayed on the touchscreen. Here, the key may also be referred to as a "button."

In S15 the CPU 12 determines whether export text 33 is stored in the USB memory 5. The export text 33 is stored in the text format under a prescribed filename. In the example of FIG. 1, export text 33 has the filename "export.txt". Thus, if a file having the filename "export.txt" is present in the USB memory 5, in S15 the CPU 12 determines that export text 33 is stored in the USB memory 5 (S15: YES) and advances to S17.

However, if export text 33 is not stored in the USB memory 5 (S15: NO), in S19 the CPU 12 determines whether import text 34 (see FIG. 1) is stored in the USB memory 5. In this example, if a file having the filename "import.txt" is stored in the USB memory 5 (S19: YES), the CPU 12 advances to S21. However, if a file having the filename "import.txt" is not stored in the USB memory 5 (S19: NO), in S23 the CPU 12 determines whether a configuration file 7 is stored in the USB memory 5. In this example, the configuration file 7 has the filename "Backup.bin" (see FIG. 1). If a file having the filename "Backup.bin" is stored in the USB memory 5 (S23: YES), the CPU 12 advances to S25. However, if a file having the filename "Backup.bin" is not stored in the USB memory 5 (S23: NO), the CPU 12 advances to S27. Note that the file "Backup.bin" file is a configuration file 7 that was exported by another MFP 3 in the export process described later. In the determination process of S23, the CPU 12 may identify, as a configuration file 7, not only the "Backup.bin" file but also another configuration file that was created by a PC application or other means in the same format as the "Backup.bin" file. Examples of such a configuration file include a file having the filename "Setup.bin." This description also applies to S79 in FIG. 5 described later. Further, the method of determining whether the export text 33 and the like are stored in the USB memory 5 is not limited to a method for determining whether a file with a specific filename is stored. For example, the CPU 12 may determine whether a file having a specific extension is present in the USB memory 5 or whether a file containing a specific character string ("export," "import," "Backup," etc.) is present in the USB memory 5.

In S17 the CPU 12 executes an export process (FIG. 4) using the export text 33. In S31 of FIG. 4, the CPU 12 determines whether both the device password and data password (hereinafter sometimes referred to simply as the "passwords") are missing from the export text 33. FIG. 8 shows an example of the export text 33. As shown in FIG. 8, a device password DVP2 and a data password DTP2 may be included in the export text 33 in text format. In this example, the export text 33 includes instructions for setting the device password DVP2 to the character string "admin" and the data password DTP2 to the character string "abcdefg".

Figure 4:
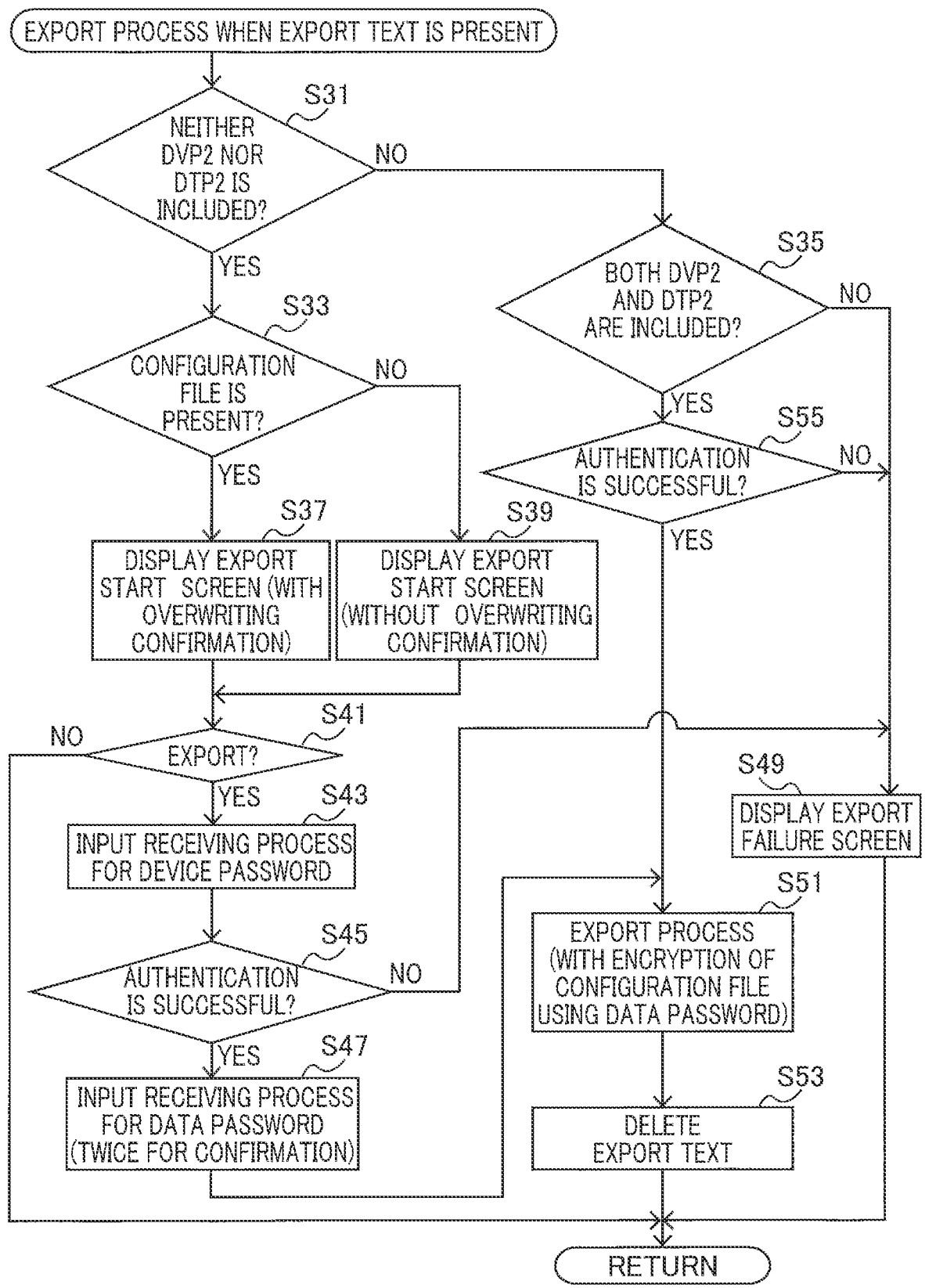
FIG. 4 is a flowchart of an export process when export text is present.
Figure 5:
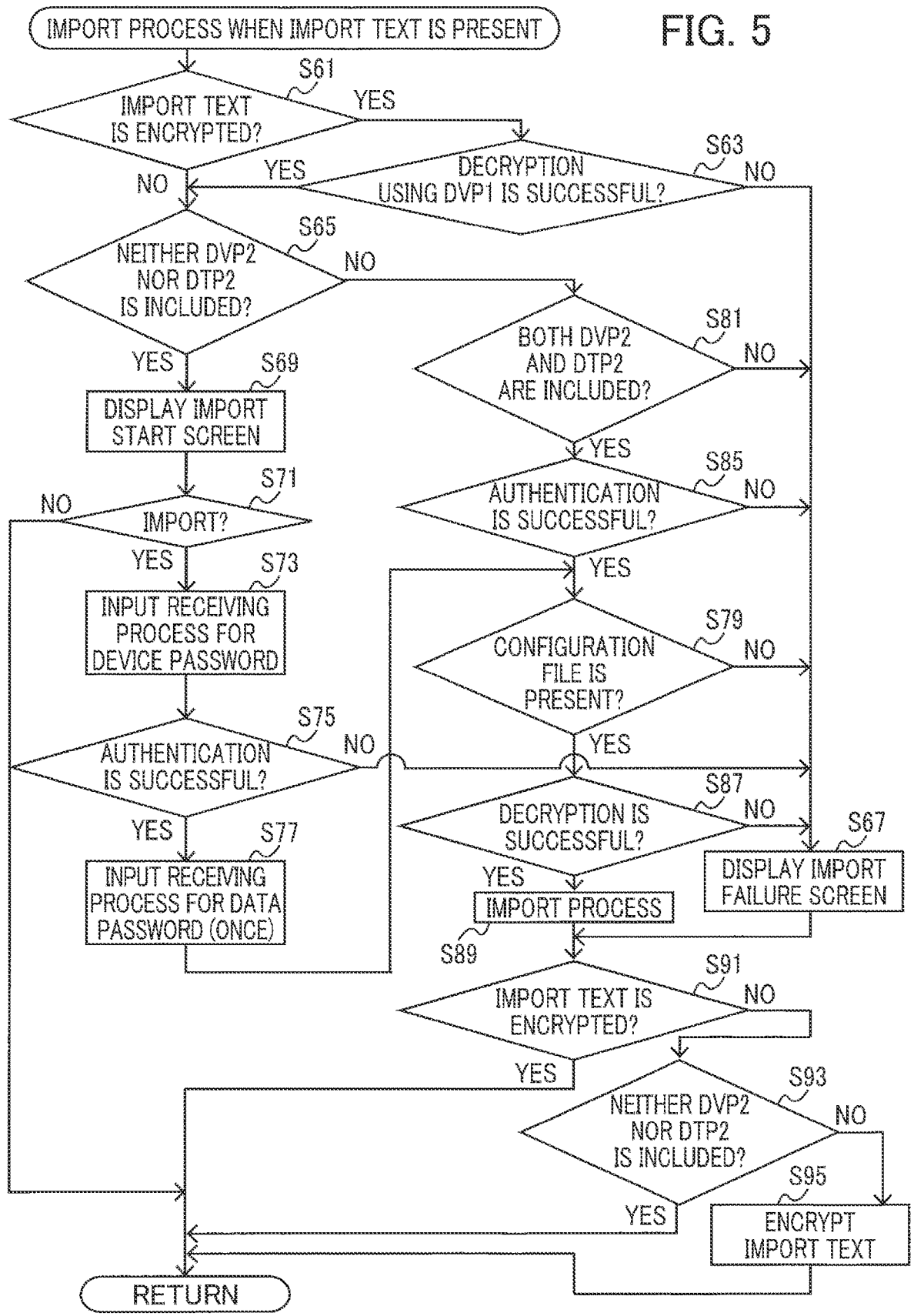
FIG. 5 is a flowchart of an import process when import text is present.
Figure 9:
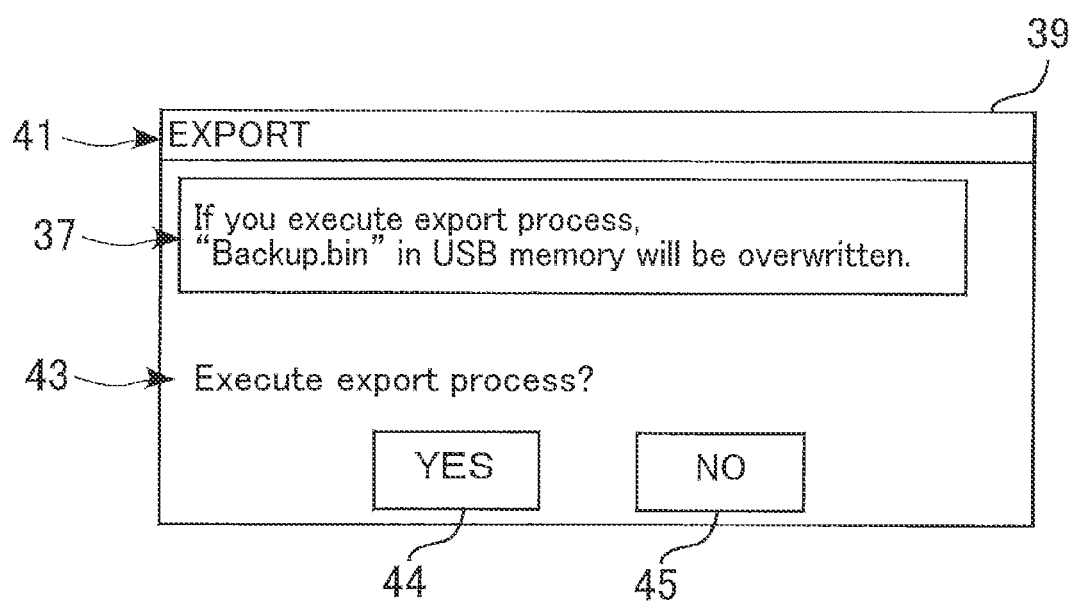
FIG. 9 is a view illustrating an export start screen.

If the CPU 12 determines in S31 of FIG. 4 that both passwords DVP2 and DTP2 are absent from the export text 33 (S31: YES), in S33 the CPU 12 determines whether a configuration file 7 is stored in the USB memory 5. The CPU 12 advances to S37 when a configuration file 7 is stored in the USB memory 5 (S33: YES) and advances to S39 when a configuration file 7 is not stored in the USB memory 5 (S33: NO). Note that, when the CPU 12 executes the export process in S51 described later in a state where a configuration file 7 is stored in the USB memory 5, the CPU 12 overwrites the configuration information 6A in the stored configuration file 7 with the configuration information 6. Accordingly, in S37 the CPU 12 displays an export start screen 39 including a message 37 informing the user of overwriting, as shown in FIG. 9. For example, in S37 the CPU 12 displays the export start screen 39 on the touchscreen of the user interface 20. The CPU 12 also displays characters, such as the text "Export," in a title field 41 of the export start screen 39 indicating the start of the export process. Additionally, the CPU 12 displays a message 43 in the export start screen 39 asking for confirmation to execute the export process, along with an icon 44 for selecting "Yes" and an icon 45 for selecting "No".

After displaying the export start screen 39 in S37 of FIG. 4, in S41 the CPU 12 determines whether a command to execute the export process has been received. If the NO icon 45 has been selected (S41: NO), the CPU 12 ends the process in FIG. 4 and consequently ends the process in FIG. 3. However, if the YES icon 44 has been selected in the export start screen 39 (S41: YES), the CPU 12 advances to S43.

On the other hand, when the CPU 12 executes the process of S39, a configuration file 7 is not stored in the USB memory 5. Thus, in this case, there is no possibility of overwriting a configuration file 7 in the export process. Hence, in S39 the CPU 12 displays the export start screen 39 without the message 37 shown in FIG. 9 (i.e., without informing the user of overwriting). In S41 the CPU 12 confirms whether an instruction to execute the export process has been received, as described above.

Figure 10:
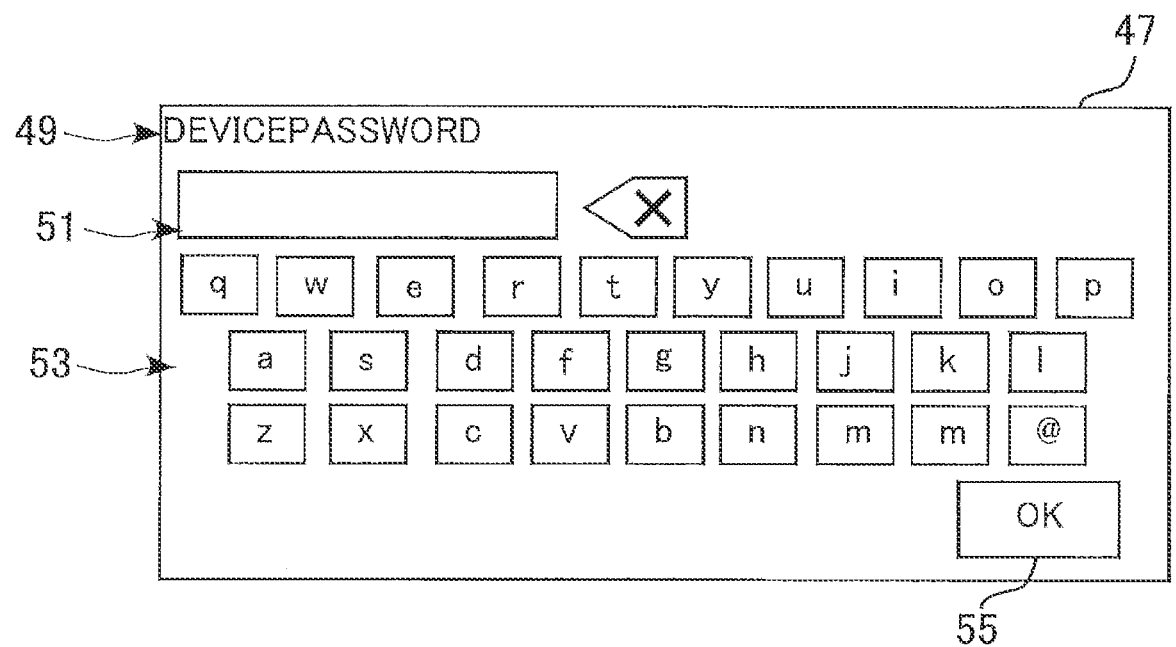
FIG. 10 is a view illustrating an input receiving screen.

In S43 the CPU 12 executes an input receiving process for receiving input of the device password DVP1. The device password DVP1 is a password for authenticating a login to the MFP 3, for example. Once the login is successfully authenticated through operations on the user interface 20, for example, the user can modify settings for the MFP 3 and the like. The CPU 12 displays an input screen 47 shown in FIG. 10 on the user interface 20 to receive input for a device password DVP1. In the top of the input screen 47, the CPU 12 displays title text 49 indicating that the input screen 47 is a screen for receiving input of the device password. In this embodiment, the CPU 12 displays "Device Password" as the title text 49, for example. In the input screen 47, the CPU 12 also displays an input field 51 for receiving input of the device password, and alphabetic keys 53 for selecting alphabetic characters to be inputted into the input field 51. By operating the alphabetic keys 53, the user can input a desired character string into the input field 51. When the user subsequently selects an OK icon 55, the CPU 12 receives the character string displayed in the input field 51 as the device password.

When the CPU 12 receives a device password via the input screen 47, in S45 the CPU 12 determines whether the received device password matches the device password DVP1 stored in the memory 11. If the passwords match, the CPU 12 determines that authentication is successful (S45: YES) and advances to S47. However, if the device password received in the input screen 47 does not match the device password DVP1 (S45: NO), in S49 the CPU 12 displays an export failure screen on the user interface 20, and subsequently ends the process of FIG. 4. In the export failure screen, the CPU 12 may display a message indicating that the export process has been cancelled or a message indicating that device password authentication failed, for example. Note that the device password DVP1 stored in the memory 11 is the password already stored at the time the vendor ships the MFP 3 to the user. Here, the same password may be stored for all MFPs 3 at the time of shipping, or different passwords may be set for each of the MFPs 3A and 3B. The MFP 3 may also accept user modifications to the device password DVP1 stored in the memory 11.

Note that the CPU 12 may repeat the process to confirm authentication of the device password DVP1 a plurality of times when authentication fails (S45: NO). In this case, the CPU 12 may display a warning screen, re-display the input screen 47, and once again receive input and determine authentication of the device password DVP1. When authentication fails, the CPU 12 may also restrict some functions of the MFP 3 for a predetermined length of time. For example, the CPU 12 may not perform authentication or initiate the process in FIG. 3 during this period of time.

In S47 the CPU 12 executes an input receiving process for receiving input of a data password. In this case, the CPU 12 displays the same input screen 47 in FIG. 10 but sets the title text 49 to "Set Data Password" in place of "Device Password," for example. In the following description, the data password received from the user will be called the data password DTP1.

In this example, in S47 the CPU 12 prompts the user to input the data password DTP1 twice and receives input of the data password DTP1 twice. If the first data password DTP1 matches the second data password DTP1, the CPU 12 advances to S51. The data password DTP1 will be used for encrypting the configuration file 7 in the export process. If the data password DTP1 inputted in the export process is incorrect, the configuration file 7 cannot be decrypted. For this reason, in S47 the CPU 12 receives input of the data password DTP1 a plurality of times to confirm that the user has not inputted the password incorrectly. However, the CPU 12 may receive input of the data password DTP1 only one time or may receive input of the data password DTP1 three or more times to confirm that the passwords match. Further, if the CPU 12 determines that the two inputted data passwords DTP1 do not match, the CPU 12 may report the error and end the process in FIG. 4 or may receive input of the data password DTP1 once again.

In S51 the CPU 12 executes the export process. In this process, for example, the CPU 12 generates a configuration file 7A (see FIG. 11) that includes the configuration information 6 of its own device, encrypts the generated configuration file 7A using the data password DTP1 received in S47, and exports the encrypted configuration file 7A to the USB memory 5 as the configuration file 7. Alternatively, in S51 the CPU 12 may encrypt the configuration information 6 of its own device without generating the configuration file 7A, and export the encrypted configuration information 6 to the USB memory 5 as the configuration file 7. FIG. 11 shows an example of the configuration file 7A prior to encryption. The configuration information 6 includes information on settings including operation settings related to image formation, such as printing with the printing engine 14, scanning with the image-reader 15, and transmitting/receiving a fax with the fax interface 18. In the example of FIG. 11, the configuration information 6 includes location information for the MFP 3, contact information for the administrator of the MFP 3, the IP address of the MFP 3, the IP address of the mail server, scan settings, copy settings, and the like. More specifically, scan settings include the IP address of the transmission destination for the scanned image data, the scanning resolution, a setting indicating single-sided or double-sided scanning, and a setting indicating monochrome or color scanning, for example. Note that the configuration information 6 may include contact information for the user of the MFP 3 in place of or in addition to contact information for the administrator of the MFP 3.

The configuration file 7A is a file in the JavaScript Object Notation (JSON) format ("JavaScript" is a Japanese registered trademark of Oracle Corporation), for example. For convenience, the notation used in FIG. 11 is different from the JSON format to avoid complicating the drawing. Naturally, the data format for the configuration information 6 is not limited to JSON but may be another format such as the comma-separated values (CSV) format. The encrypted configuration file 7 (Backup.bin) is generated by compressing the configuration file 7A (Backup.json) according to the ZIP, LZH, or other compression format and encrypting the resulting data using the data password DTP1. The Advanced Encryption Standard (AES), Data Encryption Standard (DES), or other encryption method may be employed as the method of encryption. Alternatively, the configuration file 7 may be generated by performing only an encryption without a compression process. Further, the configuration file 7 may be generated through neither a compression nor an encryption process.

In S51 the CPU 12 stores the generated configuration file 7 in the USB memory 5. If a configuration file 7 is currently stored in the USB memory 5 at this time, the CPU 12 overwrites the existing configuration file 7 with the newly generated configuration file 7. In S53 the CPU 12 deletes the export text 33 from the USB memory 5 and subsequently ends the process in FIG. 4.

On the other hand, if the CPU 12 determines in S31 that at least one of the two passwords DVP2 and DTP2 is included in the export text 33 as a character string in the prescribed format shown in FIG. 8 (S31: NO), in S35 the CPU 12 determines whether both the passwords DVP2 and DTP2 are included in the export text 33 stored in the USB memory 5. If the CPU 12 determines that both passwords are included (S35: YES), in S55 the CPU 12 performs authentication using the device password DVP2 in the export text 33. If the device password DVP2 matches the device password DVP1 stored in the memory 11 (S55: YES), the CPU 12 advances to S51 described earlier. In this case, the CPU 12 encrypts the configuration file 7A using the data password DTP2 included in the export text 33 to generate the configuration file 7 and stores the generated configuration file 7 in the USB memory 5. Hence, when both passwords DVP2 and DTP2 are included in the export text 33, the CPU 12 executes authentication, encryption, and the like without requiring any input or assistance from the user. In S53 the CPU 12 deletes the export text 33. By deleting the export text 33 that includes the passwords DVP2 and DTP2 in text format (unencrypted plaintext) in this way, the CPU 12 can enhance security. However, the CPU 12 need not execute step S53. On the other hand, if the CPU 12 determines in S35 that one of the passwords DVP2 and DTP2 is not included in the export text 33 (S35: NO) or if the CPU 12 determines in S55 that authentication with the device password DVP2 has failed (S55: NO), the CPU 12 advances to S49 described earlier.

In the process shown in FIG. 4, the CPU 12 requests the user to input both passwords DVP2 and DTP2 and performs authentication and the export process when even one of the passwords DVP2 and DTP2 is not included in the export text 33 (S31: YES). However, if only one of the passwords DVP2 and DTP2 is included in the export text 33, the CPU 12 may request the user to input only the missing password before executing authentication and the export process. For example, the CPU 12 may first determine whether the export text 33 includes the device password DVP2 and subsequently may determine whether the export text 33 includes the data password DTP2 while requesting the user to input missing passwords based on these determinations.

When executing the process in S51 after S47, the CPU 12 executes the export process based on export text 33 that includes neither the passwords DVP2 nor DTP2. As shown in FIG. 8, the export text 33 and the import text 34 described later may include, in addition to the passwords DVP2 and DTP2, instruction information 35 designating processing details for the export process or import process. For example, the export process and import process may include a plurality of processes. For example, for at least one of the plurality of processes, the instruction information 35 may include an instruction for selecting information to be exported as the configuration file 7 (SELECT in FIG. 8), an instruction for excluding some information from being exported (EXCEPTED in FIG. 8), an instruction for replacing information being exported with other information (RE- PLACED in FIG. 8), or the like. The import text 34 may similarly include instruction information 35 designating import information to be selected, excluded, replaced, or the like. Note that, in the instruction information 35 shown in FIG. 8, the character string for instructions for exclusion may be "EXCLUDE" instead of "EXCEPTED", and the character string for instructions for replacement may be "REPLACE" in place of "REPLACED".

In S21 of FIG. 3, the CPU 12 executes the import process (FIG. 5) using the import text 34. When appropriate, the following description will omit descriptions of details similar to those already described in FIG. 4. In S61 of FIG. 5, the CPU 12 determines whether the import text 34 stored in the USB memory 5 is encrypted. As will be described later in S95, the CPU 12 encrypts the import text 34 stored in the USB memory 5 using its own device password DVP1 based on a prescribed condition. Therefore, if the import text 34 has been encrypted (S61: YES), in S63 the CPU 12 executes decryption on the import text 34 using the device password DVP1 read from the memory 11 and determines whether decryption has been successful. If decryption has been unsuccessful (S63: NO), in S67 the CPU 12 displays a screen indicating that the import process failed. However, if decryption has been successful (S63: YES), the CPU 12 advances to S65.

If the CPU 12 determines in S61 that the import text 34 is not encrypted (S61: NO), the CPU 12 advances to S65. In S65 the CPU 12 determines whether both passwords DVP2 and DTP2 are absent from the import text 34 (or the decrypted text produced when step S63 has been executed). If neither the passwords DVP2 nor DTP2 is included (S65: YES), in S69 the CPU 12 displays a screen on the user interface 20 for initiating the import process. In this example, in S69 the CPU 12 displays an import start screen on the user interface 20. For example, the import start screen is a screen obtained by replacing the text in the title field 41 of the export start screen 39 shown in FIG. 9 with the text "Import", removing the message 37 from the export start screen 39, and replacing the text in the message 43 of the export start screen 39 with the text "Execute the import process?".

If the NO icon 45 (see FIG. 9) has been selected in the import start screen displayed in S69 (S71: NO), the CPU 12 ends the process in FIG. 5. However, if the YES icon 44 has been selected (S71: YES), in S73 the CPU 12 receives input for the device password, as described in S43. In S75 the CPU 12 determines whether authentication with the device password received in S73 has been successful. If authentication has failed (S75: NO), in S67 the CPU 12 displays the failure screen described above. However, if authentication has been successful (S75: YES), in S77 the CPU 12 receives input for the data password DTP1. For example, in S77 the CPU 12 displays a screen similar to the input screen 47 shown in FIG. 10 with the text "Data Password" as the title text 49. While the CPU 12 displayed "Set Data Password" as the title text 49 in S47 of FIG. 4, in S77 the CPU 12 simply displays "Data Password" without the text "Set" as the title text 49. Thus, the MFP 3 according to the present embodiment initiates the import/export processes in FIG. 3 based on the same operation (operation to the Stop key 27), and switches between the import process and export process based on what data is stored in the USB memory 5. However, in S47 the CPU 12 requests a data password DTP1 to be set in encryption, i.e., to be used for encrypting the configuration file 7, while in S77 the CPU 12 requests a data password DTP1 to be used for decrypting the configuration file 7, as will be described later. Consequently, if the CPU 12 were to simply display the same title text 49 (e.g., "Data Password") in both cases, the user could easily misunderstand whether the data password DTP1 is being requested for the export process or the import process. However, the CPU 12 according to the present embodiment modifies the title text 49 when displaying the input screen while keeping the same screen configuration in both S47 and S77, whereby incorrect input can be suppressed while simplifying the process for displaying the input screens.

Further, the CPU 12 receives input for the data password DTP1 only once in S77, for example. That is, unlike in S47, in S77 there is no need for the CPU 12 to request confirmation by prompting the user to input the data password DTP1 a plurality of times since the data password DTP1 being requested is to be used for decryption. However, the CPU 12 may request that the user input the data password DTP1 a plurality of times in S77 as well. After completing the process in S77, the CPU 12 advances to S79.

On the other hand, if the import text 34 includes at least one of the passwords DVP2 and DTP2 (S65: NO), in S81 the CPU 12 determines whether both of the passwords DVP2 and DTP2 are included in the import text 34. If one of the passwords DVP2 and DTP2 is not included (S81: NO), the CPU 12 advances to S67 described earlier. However, if both of the passwords DVP2 and DTP2 are included (S81: YES), in S85 the CPU 12 performs authentication using the device password DVP2 included in the import text 34. If authentication fails (S85: NO), the CPU 12 advances to S67 described earlier. However, if authentication is successful (S85: YES), the CPU 12 advances to S79.

In S79 the CPU 12 determines whether a configuration file 7 is stored in the USB memory 5. If a configuration file 7 is not stored in the USB memory 5 (S79: NO), the CPU 12 advances to S67 described earlier. However, if a configuration file 7 is stored in the USB memory 5 (S79: YES), in S87 the CPU 12 decrypts the configuration file 7 using the data password and determines whether decryption has been successful. Here, when S87 is being executed after S77, the data password DTP1 inputted by the user in S77 is used for decryption. When executing S87 following S81, the data password DTP2 in the import text 34 is used for decryption. If decryption fails (S87: NO), the CPU 12 advances to S67 described earlier. Note that the CPU 12 may modify the content displayed in the failure screen in S67 depending on whether the execution of S67 follows step S75, S63, S81, S85, S79, or S87 (e.g., "Decryption was unsuccessful," "Authentication was unsuccessful," etc.).

However, if decryption has been successful (S87: YES), in S89 the CPU 12 executes the import process. At this time, the CPU 12 imports the configuration information 6A from the configuration file 7 (the location and contact information shown in FIG. 11) into its own device. Here, "import" signifies storing the configuration information 6A of the configuration file 7 in the memory 11 as configuration information 6 to bring the stored configuration information 6 into an available state to its own device, for example. In this way, settings for the MFP 3A shown in FIG. 1 can be duplicated on the other MFP 3B by exporting the configuration information 6 from the MFP 3A and importing the same into the MFP 3B. Further, as with the export text 33, selection, replacement, exclusion, and the like of configuration information 6 to be imported can be performed by including instructions on processing details for the import process in the instruction information 35 in the import text 34 (see FIG. 8), even when the passwords DVP2 and DTP2 are not included. If different IP addresses are included in the import text 34 for individual MFPs 3, the CPU 12 imports the IP addresses specified for its own device in the import text 34 when importing the setting for the IP address in the configuration information 6.

After completing the process in S89 or S67, in S91 the CPU 12 determines whether the import text 34 in the USB memory 5 is encrypted. If the import text 34 is encrypted (S91: YES), the CPU 12 ends the process in FIG. 5. If the import text 34 is not encrypted (S91: NO), in S93 the CPU 12 determines whether neither the passwords DVP2 nor DTP2 is included in the import text 34. When both of the passwords DVP2 and DTP2 are missing (S93: YES), the CPU 12 ends the process in FIG. 5. However, if at least one of the passwords DVP2 and DTP2 is included (S93: NO), in S95 the CPU 12 encrypts the import text 34 in the USB memory 5 using the device password DVP1 in the memory 11, and subsequently ends the process in FIG. 5. There is no particular restriction on the method of encryption in S95, but the CPU 12 performs encryption, compression, and the like using the device password DVP1, as in the example of S51. Accordingly, when unencrypted passwords DVP2 and DTP2 are included in the import text 34 as plaintext, the CPU 12 can encrypt the passwords to make it difficult for other users to decipher. Further, by using encrypted import text 34, the import process can be executed on MFPs 3 for which the same device password DVP1 has been set. Alternatively, the CPU 12 need not encrypt the import text 34 or may encrypt the import text 34 only when both passwords DVP2 and DTP2 are included. Further, after completing the process in S89, the CPU 12 may just delete the import text 34 from the USB memory 5 without performing the process of S91-S95 if a predetermined character string is present in the import text 34. This predetermined character string may be the character string "ImportOnce", for example. In this case, the CPU 12 may delete not only the import text 34 but also the configuration file 7 from the USB memory 5. Alternatively, after completing the process in S89, the CPU 12 may just delete the import text 34 from the USB memory 5 without performing the process of S91-S95 if a predetermined character string is absent from the import text 34. Examples of this predetermined character string includes the character string "ImportMoreThanOnce". In this case, the CPU 12 may delete the configuration file 7 from the USB memory in addition to the import text 34.

Figure 6:
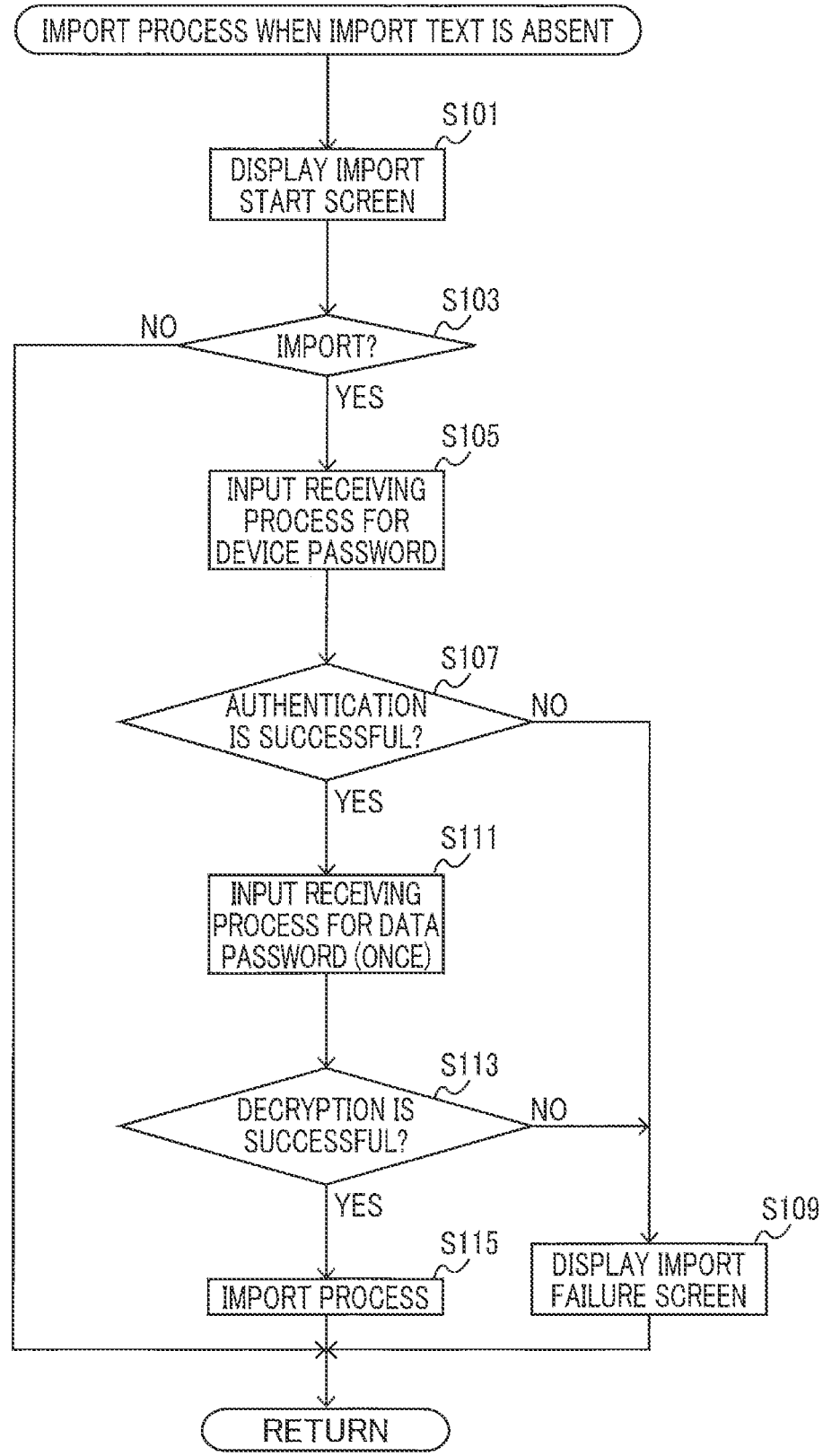
FIG. 6 is a flowchart of an import process when import text is absent.

In S25 of FIG. 3, the CPU 12 executes an import process without using the import text 34 (FIG. 6). In S101 of FIG. 6, the CPU 12 displays an import start screen, as in S69. If a command to execute the import process has been issued (S103: YES), in S105 the CPU 12 displays the input screen 47 shown in FIG. 10 and executes a process to receive a device password inputted by the user. However, if a command has not been received (S103: NO), the CPU 12 ends the process in FIG. 6. When authentication with the device password received in S105 is successful (S107: YES), in S111 the CPU 12 displays an input screen and receives input of the data password DTP1 only one time. In S113 the CPU 12 determines whether the configuration file 7 has been successfully decrypted using the inputted data password DTP1. As in S77 of FIG. 5, in S111 the CPU 12 displays an input screen that does not include the text "Set". When decryption has been successful (S113: YES), in S115 the CPU 12 executes the import process based on the configuration file 7, and subsequently ends the process in FIG. 6. However, if authentication fails (S107: NO) or if decryption fails (S113: NO), in S109 the CPU 12 displays a failure screen, and subsequently ends the process in FIG. 6. Note that the CPU 12 may delete the import text 34 from the USB memory 5 after completing the process in S115. In this case, the CPU 12 may delete not only the import text 34 but also the configuration file 7 from the USB memory 5.

Figure 7:
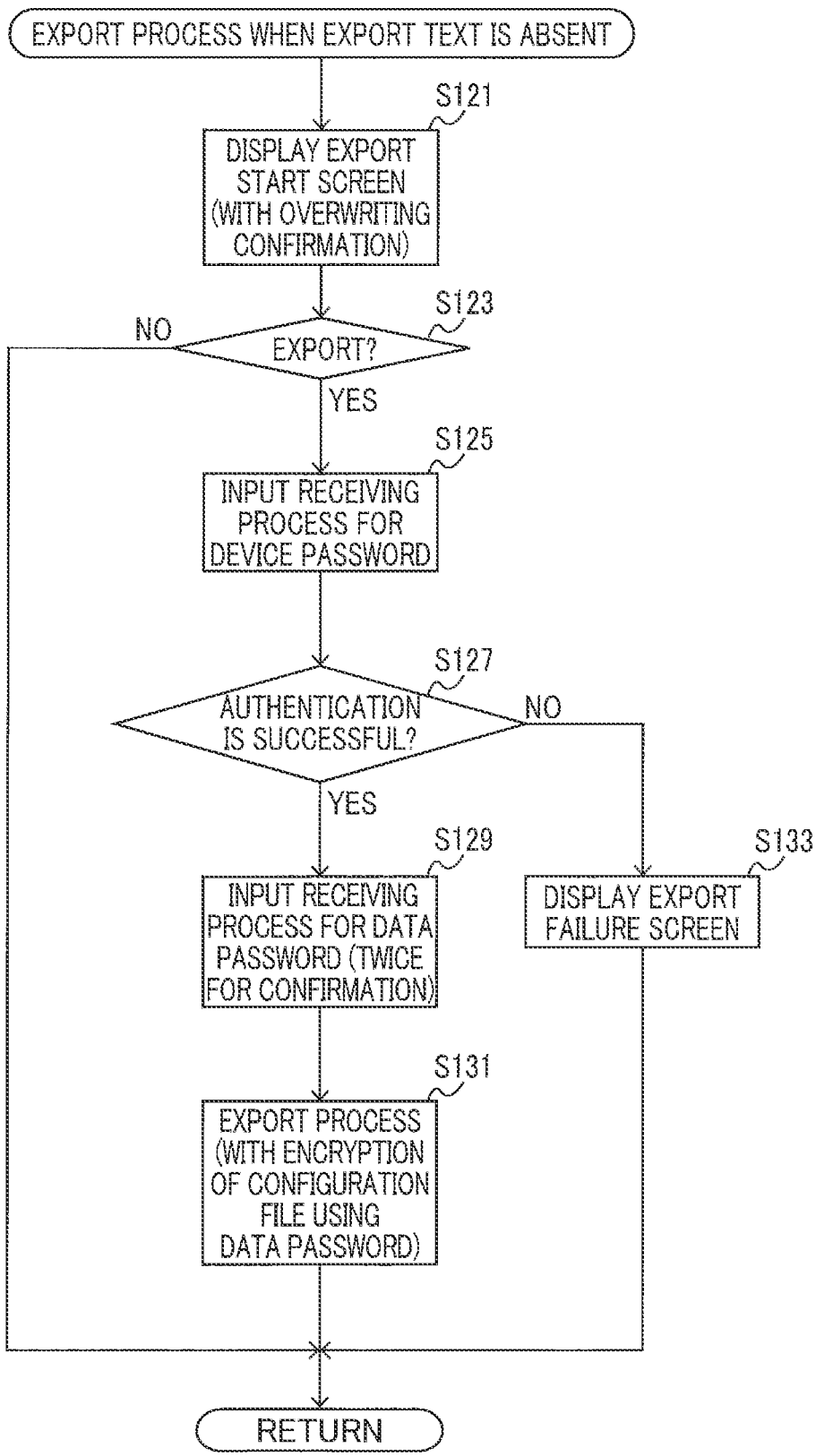
FIG. 7 is a flowchart of an export process when export text is absent.

In S27 of FIG. 3, the CPU 12 executes an export process without using the export text 33 (FIG. 7). As in S37 described above, in S121 of FIG. 7 the CPU 12 displays the export start screen 39 shown in FIG. 9 with informing the user of overwriting. If a command to perform the export process has not been received (S123: NO), the CPU 12 ends the process in FIG. 7. However, if the CPU 12 receives a command to perform the export process (S123: YES), in S125 the CPU 12 displays the input screen 47 shown in FIG. 10 and executes an input receiving process for the device password. If authentication with the device password received in S125 is successful (S127: YES), in S129 the CPU 12 displays an input screen to receive input of the data password DTP1, as in S47 of FIG. 4. In S131 the CPU 12 encrypts the configuration file 7 using the data password DTP1 inputted in S129 and exports the encrypted configuration file 7. As in S47 of FIG. 4, in S129 the CPU 12 displays the input screen including the "Set" text and receives input of a data password DTP1 twice for confirmation. After completing the export process of S131, the CPU 12 ends the process in FIG. 7. However, if authentication fails (S127: NO), in S133 the CPU 12 displays a failure screen and subsequently ends the process in FIG. 7.

The printing system 1 is an example of the image forming system. The MFP 3 is an example of the image forming apparatus. The MFP 3A is an example of the first image forming apparatus. The MFP 3B is an example of the second image forming apparatus. The USB memory 5 is an example of the recording medium. The CPU 12 is an example of the controller. Each of the printing engine 14, the image-reader 15, and the fax interface 18 is an example of the image forming engine. The USB interface 23 is an example of the media interface. The export text 33 is an example of the instruction information for export. The import text 34 is an example of the instruction information for import. Insertion of the USB memory 5 to the USB port 29, i.e., connection of the USB memory 5 to the USB interface 23 is an example of connection of the recording medium to the media interface. Holding down the Stop key 27, i.e., pressing the Stop key 27 for an extended time is an example of the prescribed operation on the user interface. A condition of the USB memory 5 being connected to the USB interface 23 while the Stop key 27 is being held down is an example of the prescribed condition.

The following effects are obtained according to the present embodiment described above. (1) When a configuration file 7 is not stored in the USB memory 5 (S23: NO), the CPU 12 encrypts a configuration file 7 storing configuration information 6 for its own device using the data password DTP1 received in S129 and exports the encrypted configuration file 7 to the USB memory 5 (S131). However, if a configuration file 7 is stored in the USB memory 5 (S23: YES), the CPU 12 decrypts the configuration file 7 in the USB memory 5 using the data password DTP1 received in S111 and imports the decrypted configuration file 7 (S115). Accordingly, by receiving the data password DTP1, the CPU 12 can execute import/export processes according to the presence or absence of the configuration file 7, even when the USB memory 5 connected to the MFP 3 does not hold the import text 34 or export text 33. Thus, the configuration information 6 of an MFP 3 can be duplicated on another MFP 3 without the use of instruction information 35 in import text 34 or the like that includes passwords and the like, thereby enhancing usability.

(2) If the CPU 12 detects that a USB memory 5 has been connected to the MFP 3 (specifically, to the USB interface 23) while the Stop key 27 is being operated (S13: YES), the CPU 12 determines that the prescribed condition has been met. Thus, an operation not normally performed can be set as the condition for initiating an import/export process, thereby suppressing the user from inadvertently starting an import/export process.

(3) When export text 33 is stored in the USB memory 5 (S15: YES), the CPU 12 encrypts the configuration information 6 in the memory 11 using the data password DTP2 in the export text 33 and exports the encrypted configuration information 6 to the USB memory 5 (S51). However, if export text 33 is not stored in the USB memory 5 (S15: NO), the CPU 12 executes the process in S27 or the like. Accordingly, when export text 33 that includes the data password DTP2, instruction information 35, and the like is stored in the USB memory 5, the CPU 12 can give priority to executing an export process based on the export text 33 (S51) over executing the process in S27 (i.e., the export process of S131 performed without export text 33) or the like. In this way, the export process can be executed with priority given to processes specified by the user in the export text 33, thereby enhancing usability.

(4) Similarly, if the import text 34 is stored in the USB memory 5 (S19: YES), the CPU 12 decrypts the configuration file 7 in the USB memory 5 using the data password DTP2 in the import text 34 and imports the decrypted configuration file 7. Accordingly, if the import text 34 is stored in the USB memory 5, the CPU 12 can give priority to executing the import process based on the import text 34 (S89) over executing the process in S25 (i.e., the import process in S115 without the import text 34) or the like.

(5) The CPU 12 displays the export start screen 39 on the user interface 20 in S121 and displays the import start screen in S101. Further, the CPU 12 begins executing the export process in S51 following S35 and begins executing the import process in S89 following S81 without displaying a start screen. Accordingly, when executing the import/export process without requiring password input for the data password DTP1 or the like, the CPU 12 can begin the process without notifying the user. Thus, when the user's intention has been specified through the export text 33 or import text 34 being stored in the USB memory 5, the CPU 12 can quickly begin processing.

(6) The CPU 12 executes the import/export process (S51, S89) based on the export text 33 or import text 34. In this way, the CPU 12 can modify the processing details to the user's specifications based on the export text 33 and the like.

(7) When the device password received in S125 matches the device password DVP1 in the memory 11 (S127: YES), the CPU 12 executes the process in S131. By performing authentication based on the device password DVP1 in this way, the leakage of configuration information 6 can be suppressed, thereby enhancing security.

(8) When the device password received in S105 matches the device password DVP1 (S107: YES), the CPU 12 executes the process in S115. Thus, by performing authentication using the device password DVP1 in this way, the occurrence of fraudulent operations, such as a malicious user altering the configuration information 6 for the MFP 3, can be suppressed to thereby enhance security.

(9) If authentication fails in S107 or S127, the CPU 12 does not execute the import process of S131 or the export process of S115, thereby suppressing leakage or falsification of the configuration information 6. Note that the CPU 12 may instead execute the import process or export process while restricting some processing details.

(10) When the passwords DVP2 and DTP2 are both absent from the export text 33 (S31: YES), the CPU 12 executes authentication (S45) using the device password received in S43 and executes the export process of S51 when authentication is successful, thereby improving security for executing the export process.

(11) When both the passwords DVP2 and DTP2 are set in the export text 33 (S35: YES), the CPU 12 performs authentication using the device password DVP2 in the export text 33 and executes the export process in S51 when authentication is successful (S55: YES). Accordingly, the present embodiment can enhance security for executing the export process.

(12) When a configuration file 7 is stored in the USB memory 5 (S33: YES), the CPU 12 notifies the user in S37 that the configuration file 7 will be overwritten. On the other hand, the CPU 12 does not notify the user that the configuration file 7 will be overwritten when both the passwords DVP2 and DTP2 are included in the export text 33. Accordingly, if the export text 33 exists but does not include the passwords, the CPU 12 can alert the user that the configuration file 7 will be overwritten. However, if the user stores export text 33 having both the passwords DVP2 and DTP2 included therein is the USB memory 5, the CPU 12 does not notify the user that the configuration file 7 will be overwritten but rather executes the export process immediately.

(13) When both the passwords DVP2 and DTP2 are absent from the import text 34 (S65: YES), the CPU 12 receives input of a device password and executes authentication with the received device password (S75). When authentication is successful (S75: YES), the CPU 12 executes the import process in S89, thereby enhancing security for executing the import process.

(14) When both the passwords DVP2 and DTP2 are included in the import text 34 (S81: YES), the CPU 12 performs authentication using the device password DVP2 in the import text 34 (S85). If authentication is successful (S85: YES), the CPU 12 executes the import process in S89, thereby enhancing security for executing the import process.

(15) In S129 the CPU 12 informs the user that the user interface 20 is currently receiving input of the data password DTP1 for performing the export process by displaying the character string "Set" in the title text 49 of the input screen 47 and in S111 notifies the user that the user interface 20 is currently receiving input the data password DTP1 for performing the import process by removing the character string "Set." Accordingly, when receiving the data password DTP1, the CPU 12 can notify the user which of the import and export processes is to be executed. In the present embodiment, one of the import and export processes can be executed by operating the Stop key 27. While this method simplifies operations on the one hand, there is a chance that the user could unintentionally execute an import process or an export process. Therefore, the CPU 12 can suppress the occurrence of such erroneous operations by displaying different input screens for the data password DTP1 depending on whether the process is the import or export process.

While the specific embodiment has been described in detail, it would be apparent to those skilled in the art that many modifications and variations may be made therein. The content and order of processes performed in the flow-charts of FIGS. 3-7 are merely an example and may be modified as needed. For example, as shown in FIG. 3, the CPU 12 executes S15 prior to S19 to prioritize the export process over the import process, but the CPU 12 may execute S19 first to give priority to the import process. In FIG. 7 the CPU 12 may execute S121 and S123 after S125 and in FIG. 6 may execute S101 and S103 after S105. The CPU 12 may also notify the user that an import process or export process is beginning according to a different method than displaying a screen, such as turning on indicator lamps or playing sounds for guidance. Alternatively, the CPU 12 need not notify the user that the import process or export process is starting. The CPU 12 also need not perform authentication using the device password DVP1.

The image forming apparatus of the present disclosure is not limited to an MFP 3 but may be a printer having only a printing function, or a scanner or copier. Alternatively, a label printer, production printer, embroidery machine, 3D printer, laser marking machine, machine tool, or the like may be employed as the image forming apparatus. Further, in addition to or in place of notification of the start of an export process or import process in S37 and the like, the CPU 12 may notify the user of the start of an export process or import process in the input screen for the data password DTP1 in S47, S77, S111, S129, and the like. For example, the CPU 12 may display the message "Please enter a data password for importing" in the input screen for the data password DTP1. The controller of the present disclosure is not limited to the CPU 12 but may be an application-specific integrated circuit (ASIC), a field-programmable gate array (FPGA), or the like. Additionally, the media interface of the present disclosure is not limited to the USB interface 23 but may be a memory card slot, IEEE 1394, or any of various other interfaces. Additionally, a wireless interface such as a near-field communication (NFC) interface or the Bluetooth interface ("Bluetooth" is a Japanese registered trademark of Bluetooth SIG, Inc.) may be employed as the media interface. The recording medium in the present disclosure is not limited to the USB memory 5 but may be a memory card, a portable hard disk drive (HDD), or a portable solid-state drive (SDD). Further, although the CPU 12 in the embodiment performs encryption of the import text 34 in S95, the encryption of the import text 34 need not be performed.

What is claimed is:

1. An image forming system comprising:
   a plurality of image forming apparatuses including a first image forming apparatus and a second image forming apparatus, each of the plurality of image forming apparatuses comprising:
   an image forming engine;
   a memory;
   a media interface;
   a user interface; and
   a controller configured to control the image forming engine to perform image formation according to an operation setting included in configuration information stored in the memory,
   wherein the controller of the first image forming apparatus is configured to perform:
   (a) determining whether a first prescribed condition is met, wherein at least connection of a recording medium to the media interface of the first image forming apparatus is required for the first prescribed condition to be met;
   (b) in a case where determination is made in (a) that the first prescribed condition is met, determining whether configuration information exported from one of the plurality of image forming apparatuses is stored in a recording medium connected to the media interface of the first image forming apparatus;
   (c) in a case where determination is made in (b) that configuration information exported from one of the plurality of image forming apparatuses is not stored in the recording medium connected to the media interface of the first image forming apparatus, receiving a data password through the user interface of the first image forming apparatus;
   (d) in response to receiving the data password in (c), encrypting the configuration information stored in the memory of the first image forming apparatus using the data password received in (c); and
   (e) exporting the configuration information encrypted in (d) to the recording medium connected to the media interface of the first image forming apparatus,
   wherein the controller of the second image forming apparatus is configured to perform:
   (f) determining whether a second prescribed condition is met, wherein at least connection of a recording medium to the media interface of the second image forming apparatus is required for the second prescribed condition to be met;
   (g) in a case where determination is made in (f) that the second prescribed condition is met, determining whether configuration information exported from one of the plurality of image forming apparatuses is stored in a recording medium connected to the media interface of the second image forming apparatus;
   (h) in a case where determination is made in (g) that configuration information exported from one of the plurality of image forming apparatuses is stored in the recording medium connected to the media interface of the second image forming apparatus, receiving a data password through the user interface of the second image forming apparatus;
   (i) in response to receiving the data password in (h), decrypting the configuration information stored in the recording medium connected to the media interface of the second image forming apparatus using the data password received in (h); and
   (j) importing the configuration information decrypted in (i).

2. An image forming apparatus comprising:
   an image forming engine;
   a memory;
   a media interface;
   a user interface; and
   a controller configured to control the image forming engine to perform image formation according to an operation setting included in configuration information stored in the memory, the controller being configured to perform:
   (a) determining whether a prescribed condition is met, wherein at least connection of a recording medium to the media interface is required for the prescribed condition to be met;
   (b) in a case where determination is made in (a) that the prescribed condition is met, determining whether configuration information is stored in a recording medium connected to the media interface;
   (c) in a case where determination is made in (b) that configuration information is not stored in the connected recording medium, receiving a data password through the user interface;
   (d) in response to receiving the data password in (c), encrypting the configuration information stored in the memory using the data password received in (c);

(e) exporting the configuration information encrypted in (d) to the connected recording medium;

(f) in a case where determination is made in (b) that configuration information is stored in the connected recording medium, receiving a data password through the user interface;

(g) in response to receiving the data password in (f), decrypting the configuration information stored in the connected recording medium using the data password received in (f); and (h) importing the configuration information decrypted in (g).

3. The image forming apparatus according to claim 2, wherein, in response to detecting connection of a recording medium to the media interface while a prescribed operation is being performed on the user interface, the controller determines that the prescribed condition is met.

4. The image forming apparatus according to claim 2, wherein the controller is configured to further perform:

(i) in a case where determination is made in (a) that the prescribed condition is met, determining whether instruction information for export is stored in the connected recording medium;

(j) in a case where determination is made in (i) that instruction information for export is stored in the connected recording medium, determining whether the instruction information for export includes a data password;

(k) in a case where determination is made in (j) that the instruction information for export includes a data password, encrypting the configuration information stored in the memory using the data password included in the instruction information for export; and (l) exporting the configuration information encrypted in (k) to the connected recording medium, and wherein the determining in (b) is performed in a case where determination is made in (i) that instruction information for export is not stored in the connected recording medium.

5. The image forming apparatus according to claim 4, wherein the controller is configured to further perform:

(m) in a case where determination is made in (a) that the prescribed condition is met, determining whether instruction information for import is stored in the connected recording medium;

(n) in a case where determination is made in (m) that instruction information for import is stored in the connected recording medium, determining whether the instruction information for import includes a data password;

(o) in a case where determination is made in (n) that the instruction information for import includes a data password, determining whether configuration information is stored in the connected recording medium;

(p) in a case where determination is made in (o) that configuration information is stored in the connected recording medium, decrypting the configuration information stored in the connected recording medium using the data password included in the instruction information for import; and (q) importing the configuration information decrypted in (p), and wherein, in a case where determination is made in (m) that instruction information for import is not stored in the connected recording medium, the controller performs the determining in (b).

6. The image forming apparatus according to claim 5, wherein the controller is configured to further perform:

after determining in (b) that configuration information is not stored in the connected recording medium and before performing the exporting in (e), notifying of the start of the exporting in (e); and after determining in (b) that configuration information is stored in the connected recording medium and before performing the importing in (h), notifying of the start of the importing in (h), wherein, in a case where the controller performs the exporting in (l), the controller starts the exporting in (l) without notifying of the start of the exporting in (l), and wherein, in a case where the controller performs the importing in (q), the controller starts the importing in (q) without notifying of the start of the importing in (q).

7. The image forming apparatus according to claim 5, wherein the exporting in (l) and the importing in (q) includes a plurality of processes, wherein, based on the instruction information for export, the controller performs at least one of the plurality of processes included in the exporting in (l), and wherein, based on the instruction information for import, the controller performs at least one of the plurality of processes included in the importing in (q).

8. The image forming apparatus according to claim 5, wherein the controller is configured to further perform:

(r) in a case where determination that instruction information for export is stored in the connected recording medium is made in (i) and the instruction information for export includes neither a device password nor a data password, receiving a device password through the user interface; and (s) determining whether the device password received in (r) matches a device password stored in the memory, and wherein, in a case where determination is made in (s) that the device password received in (r) matches the device password stored in the memory, the controller performs the encrypting in (k) and the exporting in (l).

9. The image forming apparatus according to claim 8, wherein the controller is configured to further perform:

(t) in a case where determination that instruction information for export is stored in the connected recording medium is made in (i) and the instruction information for export includes both a device password and a data password, determining whether the device password included in the instruction information for export matches the device password stored in the memory, and wherein, in a case where determination is made in (t) that the device password included in the instruction information for export matches the device password stored in the memory, the controller performs the encrypting in (k) and the exporting in (l).

10. The image forming apparatus according to claim 8, wherein the controller is configured to further perform:

(t) in a case where determination that instruction information for export is stored in the connected recording medium is made in (i) and the instruction information for export includes neither a device password nor a data password, determining whether configuration information is stored in the connected recording medium; and (u) in a case where determination is made in (t) that configuration information is stored in the connected recording medium, notifying that the configuration information stored in the connected recording medium is to be overwritten, wherein, after performing the notifying in (u), the controller performs the exporting in (l) by overwriting the configuration information stored in the connected recording medium with the configuration information encrypted in (k), and wherein, in a case where:
   determination that instruction information for export is stored in the connected recording medium is made in (i);
   the instruction information for export includes both a device password and a data password; and
   configuration information is stored in the connected recording medium,
the controller performs the exporting in (l) by overwriting the configuration information stored in the connected recording medium with the configuration information encrypted in (k), without notifying that the configuration information stored in the connected recording medium is to be overwritten.

11. The image forming apparatus according to claim 5, wherein the controller is configured to further perform:
   (r) in a case where determination that instruction information for import is stored in the connected recording medium is made in (m) and the instruction information for import includes neither a device password nor a data password, receiving a device password through the user interface; and
   (s) determining whether the device password received in (r) matches a device password stored in the memory, and
wherein, in a case where determination is made in (s) that the device password received in (r) matches the device password stored in the memory, the controller performs the decrypting in (g) and the importing in (h).

12. The image forming apparatus according to claim 11, wherein the controller is configured to further perform:
   (t) in a case where determination that instruction information for import is stored in the connected recording medium is made in (m) and the instruction information for import includes both a device password and a data password, determining whether the device password included in the instruction information for import matches the device password stored in the memory, and
wherein, in a case where determination is made in (t) that the device password included in the instruction information for import matches the device password stored in the memory, the controller performs the decrypting in (g) and the importing in (h).

13. The image forming apparatus according to claim 2, wherein the controller is configured to further perform:
   (i) in a case where determination is made in (b) that configuration information is not stored in the connected recording medium, receiving a device password through the user interface; and
   (j) determining whether the device password received in (i) matches a device password stored in the memory, and wherein, in a case where determination is made in (j) that the device password received in (i) matches the device password stored in the memory, the controller performs the encrypting in (d) and the exporting in (e).

14. The image forming apparatus according to claim 13, wherein the controller is configured to further perform:
   (k) in a case where determination is made in (b) that configuration information is stored in the connected recording medium, receiving a device password through the user interface; and
   (l) determining whether the device password received in (k) matches the device password stored in the memory, and
wherein, in a case where determination is made in (l) that the device password received in (k) matches the device password stored in the memory, the controller performs the decrypting in (g) and the importing in (h).

15. The image forming apparatus according to claim 14, wherein, in a case where determination is made in (j) that the device password received in (i) does not match the device password stored in the memory, the controller restricts execution of the encrypting in (d) and the exporting in (e), and
wherein, in a case where determination is made in (l) that the device password received in (k) does not match the device password stored in the memory, the controller restricts execution of the decrypting in (g) and the importing in (h).

16. The image forming apparatus according to claim 2, wherein the controller is configured to further perform:
   (i) in the receiving in (c), notifying that the user interface is currently receiving a data password for execution of the exporting in (e); and
   (j) in the receiving in (f), notifying that the user interface is currently receiving a data password for execution of the importing in (h).

17. A non-transitory computer-readable storage medium storing computer-readable instructions for an image forming apparatus, the image forming apparatus including:
   an image forming engine;
   a memory;
   a media interface;
   a user interface; and
   a controller configured to control the image forming engine to perform image formation according to an operation setting included in configuration information stored in the memory,
the computer-readable instructions, when executed by the controller, causing the image forming apparatus to perform:
   (a) determining whether a prescribed condition is met, wherein at least connection of a recording medium to the media interface is required for the prescribed condition to be met;
   (b) in a case where determination is made in (a) that the prescribed condition is met, determining whether configuration information is stored in a recording medium connected to the media interface;
   (c) in a case where determination is made in (b) that configuration information is not stored in the connected recording medium, receiving a data password through the user interface;
   (d) in response to receiving the data password in (c), encrypting the configuration information stored in the memory using the data password received in (c);
   (e) exporting the configuration information encrypted in (d) to the connected recording medium;

(f) in a case where determination is made in (b) that configuration information is stored in the connected recording medium, receiving a data password through the user interface;
(g) in response to receiving the data password in (f), decrypting the configuration information stored in the connected recording medium using the data password received in (f); and
(h) importing the configuration information decrypted in (g).

* * * * *